US010776794B2

(12) United States Patent
Katib et al.

(10) Patent No.: US 10,776,794 B2
(45) Date of Patent: Sep. 15, 2020

(54) MECHANISM FOR CUSTOMER SERVICE WITH SECURITY AND PRIVACY

(71) Applicant: MICROSOFT TECHNOLOGY LICENSING, LLC, Redmond, WA (US)

(72) Inventors: Jawad Ahmed Ibrahim Katib, Sammamish, WA (US); Arun R. Mannengal, Bellevue, WA (US); Samuel Johnson Shelton, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 646 days.

(21) Appl. No.: 15/613,926

(22) Filed: Jun. 5, 2017

(65) Prior Publication Data

US 2018/0349920 A1    Dec. 6, 2018

(51) Int. Cl.
*G06Q 30/00* (2012.01)
*H04L 29/06* (2006.01)

(52) U.S. Cl.
CPC ....... *G06Q 30/0185* (2013.01); *G06Q 30/016* (2013.01); *H04L 63/0815* (2013.01); *H04L 63/123* (2013.01)

(58) Field of Classification Search
CPC ............. H04L 63/0815; H04L 63/123; G06Q 30/0185; G06Q 30/016
See application file for complete search history.

(56) References Cited

U.S. PATENT DOCUMENTS

| 6,788,775 | B1 | 9/2004 | Simpson |
| 8,495,720 | B2 | 7/2013 | Counterman |
| 8,825,223 | B2 | 9/2014 | Carney et al. |
| 8,917,840 | B2 | 12/2014 | Kosaraju et al. |
| 10,268,995 | B1* | 4/2019 | Zimmerman .......... G06Q 40/08 |
| 2002/0169988 | A1* | 11/2002 | Vandergeest ........ H04L 63/0823 726/4 |
| 2008/0056233 | A1* | 3/2008 | Ijidakinro ......... H04L 29/06027 370/352 |

(Continued)

FOREIGN PATENT DOCUMENTS

WO    2012073233 A1    6/2012

*Primary Examiner* — Saleh Najjar
*Assistant Examiner* — Devin E Almeida
(74) *Attorney, Agent, or Firm* — Shook, Hardy & Bacon L.L.P.

(57) ABSTRACT

A mechanism for customer service with security and privacy is provided. In a support service scenario for products or services, a determination is made based on an interaction with a customer that additional verification is needed. An authentication code is communicated to the customer via a mode chosen by the customer. At the same time, a hash of the authentication code is stored along with session and customer details. The customer is prompted to provide the authentication code and a hash of the provided authentication code is compared to the hash of the authentication code that was stored with the session and customer details. If the hashes match, it can be presumed that the agent is communicating with the correct customer and customer details are revealed. If the hashes do not match, the agent does not see any private customer details.

20 Claims, 9 Drawing Sheets

(56) References Cited

U.S. PATENT DOCUMENTS

| | | |
|---|---|---|
| 2008/0281757 A1 | 11/2008 | Riise et al. |
| 2009/0025063 A1 | 1/2009 | Thomas |
| 2010/0122082 A1 | 5/2010 | Deng et al. |
| 2012/0197797 A1* | 8/2012 | Grigg ................ G06Q 20/1085 705/43 |
| 2015/0295930 A1* | 10/2015 | Dixon ................... H04W 12/08 713/181 |
| 2016/0127555 A1* | 5/2016 | Hanson ............... H04M 3/5232 455/417 |

* cited by examiner

MECHANISM FOR CUSTOMER SERVICE WITH SECURITY AND PRIVACY

BACKGROUND

Customer service is an integral part of any product or service offerings. In many cases, the support experience can only be experienced by communicating with a customer service center and engaging with a live agent over telephone or via chats. Without a mechanism that identifies the customer conclusively based on information present in the repositories, current customer service systems are vulnerable to fraud by malicious actors impersonating customers.

For example, one of the most common types of fraud is the practice of impersonating a customer. Such interactions are difficult to recognize and the malicious actor may seem legitimate and may initiate conversations that appear genuine. However, these interactions may actually be initiated by scammers and identity harvesters.

In some systems, customer service agents ("agents") are provided details about the customer to confirm the identity of the customer. However, these systems are vulnerable to a different type of fraud that is perpetrated by rogue agents. For example, in these instances, the rogue agents may skim the customer details for later user.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

At a high level, embodiments of the present invention are generally directed to providing a mechanism for customer service with security and privacy. More particularly, in a support service scenario for products or services, a determination is made based on an interaction with a customer that additional verification is needed to identify the customer conclusively before unmasked customer details are provided to the agent. To do so, an authentication code is communicated to the customer via a mode chosen by the customer. At the same time, a hash of the authentication code is stored along with session and customer details, while the authentication code itself is destroyed so that it cannot be reused. The customer is prompted to provide the authentication code and a hash of the provided authentication code is compared to the hash of the authentication code that was stored with the session and customer details. If the hashes match, then it can be presumed that the agent is communicating with the correct customer and private customer details are revealed. If the hashes do not match, then the agent does not see any private customer details and potential fraud is avoided and privacy of the customer is protected.

BRIEF DESCRIPTION OF THE DRAWINGS

The present invention is described in detail below with reference to the attached drawing figures, wherein.

DETAILED DESCRIPTION

The technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

As noted in the Background, customer service is an integral part of any product or service offerings. In many cases, the support experience can only be experienced by communicating with a customer service center and engaging with a live agent over telephone or via chats. Without a mechanism that identifies the customer conclusively based on information present in the repositories, current customer service systems are vulnerable to fraud by malicious actors impersonating customers.

For example, one of the most common types of fraud is the practice of impersonating a customer. Such interactions are difficult to recognize and the malicious actor may seem legitimate and may initiate conversations that appear genuine. However, the interactions may actually be initiated by scammers and identity harvesters.

In some systems, customer service agents ("agents") are provided details about the customer to confirm the identity of the customer. However, these systems are vulnerable to a different type of fraud that is perpetrated by rogue agents. For example, in these instances, the rogue agents may skim the customer details for later user.

The technology described herein solves the problem of customer and agent fraud and improves security and privacy. In a support service scenario for products or services, a determination is made based on an interaction with a customer that additional verification is needed to identify the customer conclusively before unmasked customer details are provided to the agent. To do so, an authentication code is communicated to the customer via a mode chosen by the customer. At the same time, a hash of the authentication code is stored along with session and customer details, while the authentication code itself is destroyed so that it cannot be reused. The customer is prompted to provide the authentication code and a hash of the provided authentication code is compared to the hash of the authentication code that was stored with the session and customer details. If the hashes match, then it can be presumed that the agent is communicating with the correct customer and private customer details are revealed. If the hashes do not match, then the agent does not see any private customer details and potential fraud is avoided and privacy of the customer is protected.

Accordingly, one embodiment of the present disclosure is directed to a method of a mechanism for customer service with security and privacy. The method comprises receiving, at a case management service, a support request from a customer via a support portal. The method also comprises communicating the support request to an agent via an agent desktop. The method further comprises connecting the customer to the agent via the support portal. The method also comprises determining the customer is an existing customer in the system. The method further comprises receiving a search request at the case management service, the search request based on a phone number corresponding to the customer. The method also comprises, in response to the search request, retrieving customer details. The method further comprises providing redacted customer details at the agent desktop until an authentication code has been communicated from the agent desktop to the case management service.

In another embodiment, the present disclosure is directed to a computer-readable storage medium comprising computer-executable instructions that, when executed by a computer, causes the computer to perform operations to facilitate providing a mechanism for customer service with security and privacy. The operations include receiving a support request corresponding to an incident initiated by a customer at a customer device, the support request including a phone number of the customer. The operations also include masking customer details for the customer, the customer details being provided to an agent device. The operations further include generating an authentication code and a stored hash corresponding to the support request. The operations also include providing the authentication code to the customer via the customer device. The operations further include receiving the authentication code at an authentication device. The operations also include computing a hash for the authentication code received at the authentication device. The operations further include determining the hash matches the stored hash. The operations also include unmasking the customer details for the customer at the agent device.

In yet another embodiment, the present disclosure is directed to a computerized system for providing a mechanism for customer service with security and privacy. The system includes a processor and a computer storage medium storing computer-useable instructions that, when used by the processor, cause the processor to: receive, at a case management service, a support request from a customer; communicate the support request to an agent via an agent desktop; determine the customer is an existing customer in the system; receive a search request at the case management service, the search request based on a phone number corresponding to the customer; in response to the search request, retrieve customer details; and mask the customer details at the agent desktop until a valid authentication code has been communicated to the case management service.

Figure 1:
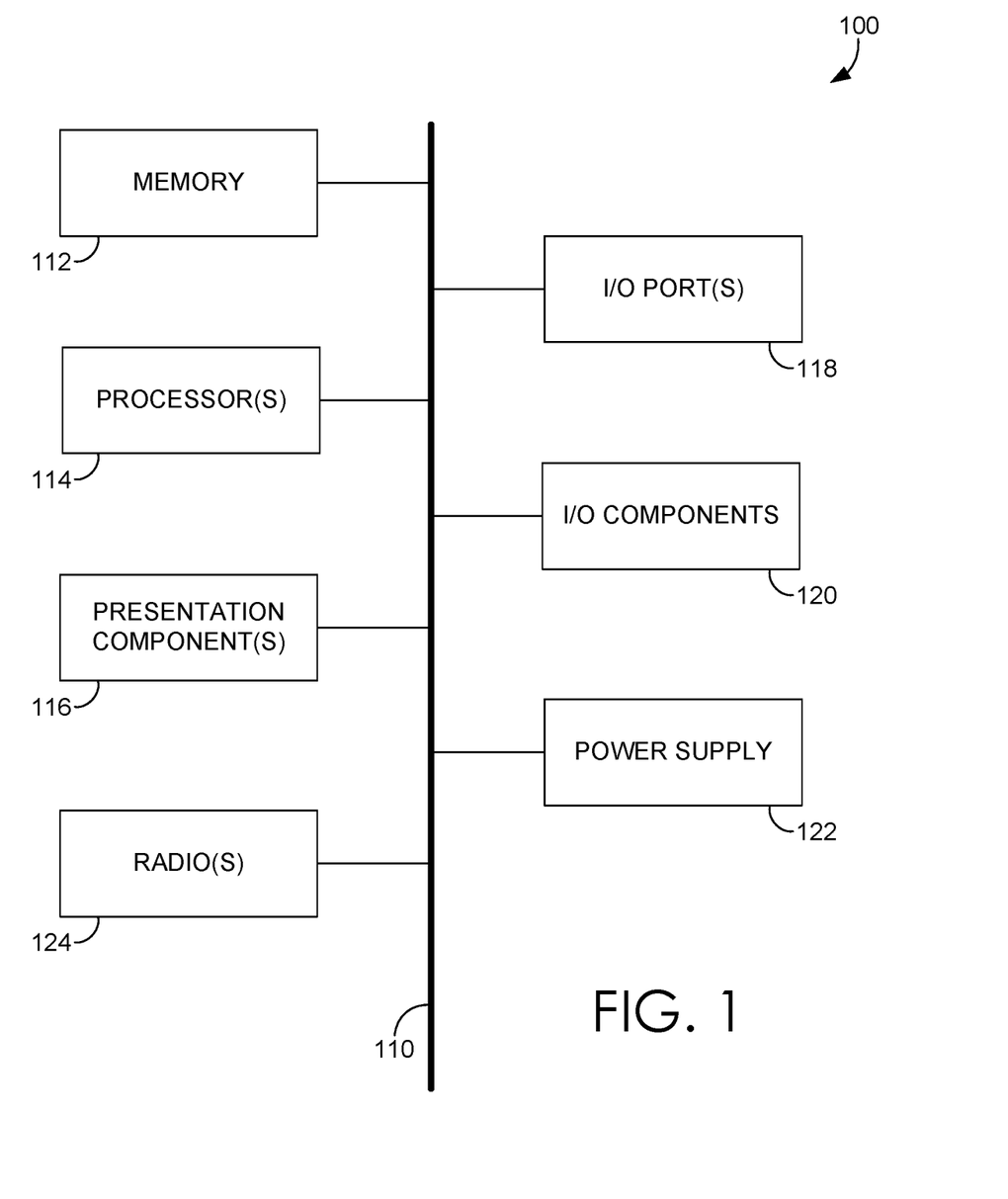
FIG. 1 is a schematic showing an exemplary computing environment suitable for use with the technology described herein.

Referring to the drawings in general, and initially to FIG. 1 in particular, an exemplary operating environment for implementing aspects of the technology described herein is shown and designated generally as computing device 100. Computing device 100 is but one example of a suitable computing environment and is not intended to suggest any limitation as to the scope of use or functionality of the technology described herein. Neither should the computing device 100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include a radio 124. The radio 124 transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Exemplary Case Management Framework for a Support Portal/Bot Scenario

Figure 2:
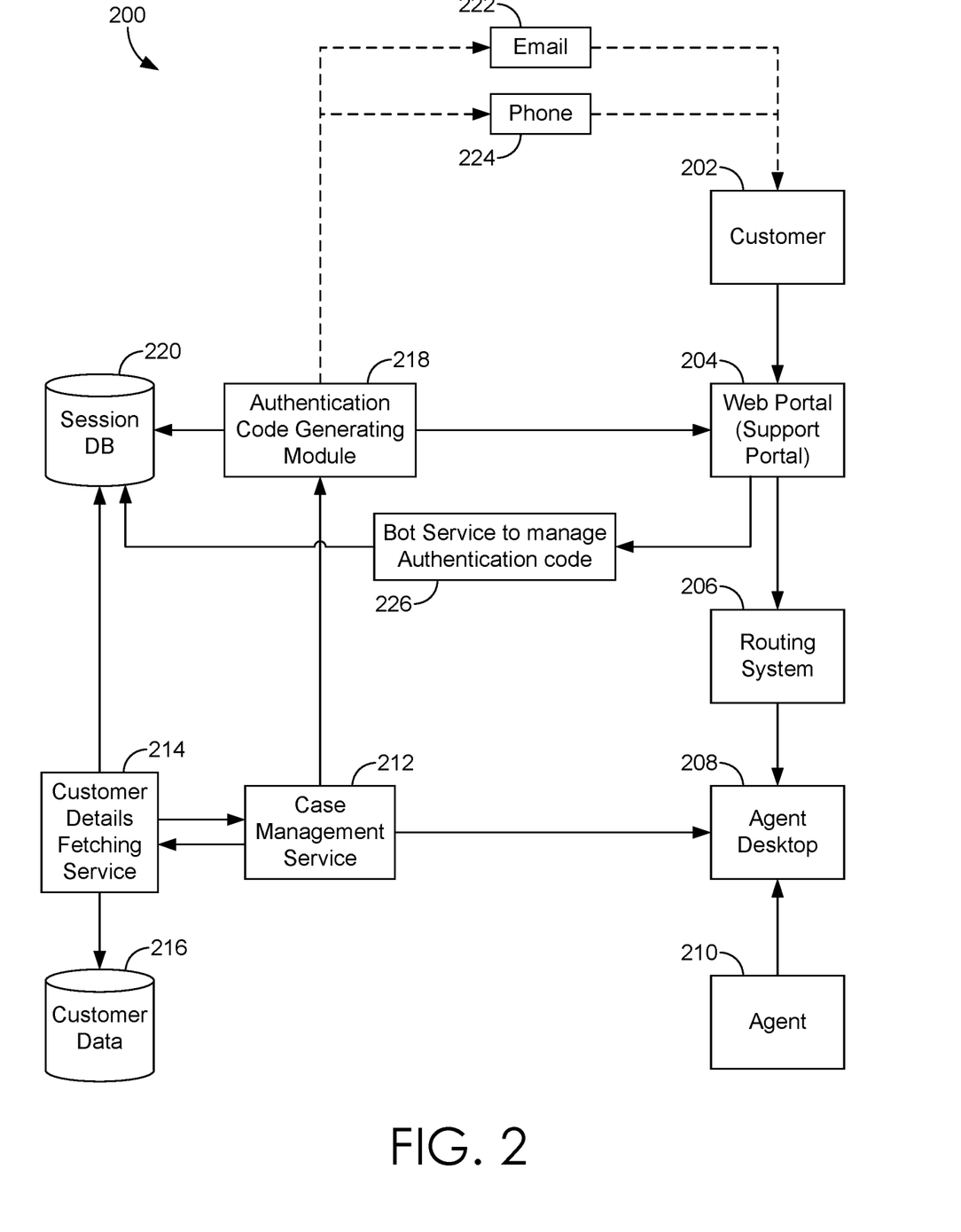
FIG. 2 is a block diagram showing an exemplary case management framework for a support portal/Bot scenario, in accordance with aspects of the technology described herein.

Turning now to FIG. 2, an exemplary case management framework 200 is shown, in accordance with an aspect of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The case management framework 200 generally operates to provide a customer with security and privacy during a support request. As shown in FIG. 2, the case management framework 200 includes, among other components not shown, web portal (support portal) 204, routing system 206, agent desktop 208, case management service 212, customer details fetching service 214, customer database 216, authentication code generating module 218, session database 220, and Bot service 226. It should be understood that the case management framework 200 shown in FIG. 2 is an example of one suitable computing system architecture. Each of the components shown in FIG. 2 may be implemented via any type of computing device, such as computing device 100 described with reference to FIG. 1, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of web portals, routing systems, agent desktops, case management services, customer details fetching services, customer databases, authentication code generating modules, session databases, or bot services, may be employed within the case management framework 200 within the scope of the present disclosure. Each may comprise a single device or multiple devices cooperating in a distributed environment. For instance, the case management service 212 may be provided via multiple devices arranged in a distributed environment that collectively provide the functionality described herein. In other embodiments, a single device may provide the functionality of multiple components of the case management framework 200. For example, the case management service 212 may include the authentication code generating module 218 and/or the customer details fetching service 214. Additionally, other components not shown may also be included within the network environment.

As shown in FIG. 2, the case management framework 200 includes databases 216, 220. While databases 216, 220 are shown in FIG. 2, it should be understood that the case management framework 200 may employ any number of databases. Each database 216, 220 may store information that facilitate the case management framework 200 in providing a customer with security and privacy during a support request. For example, customer database 216 stores customer details for the customer. However, any customer details that are provided to the agent 210 via the agent desktop 208 are initially masked or redacted. Session database 220 stores a hash of the authentication code provided by authentication code generating module 218. The stored hash can be used to confirm the identity of the customer prior to unmasking the customer details provided to the agent 210 via the agent desktop 208.

The case management framework 200 initially receives a customer support request from customer 202 via web portal 204. The web portal 204 may be accessed by any computing device (such as computing device 100 of FIG. 1). Routing system 206 routes the customer support request to an agent desktop 208 which may be accessed by an agent 210 via any computing device (such as computing device 100 of FIG. 1). If the case management service 212 cannot locate any customer details for the particular customer (which may be looked up using the telephone number of the customer 202), the agent 210 proceeds with completing the customer support request.

However, if the case management service 212 locates customer details stored in the customer database 216 via the customer details fetching service 214, the customer details are initially returned to the agent desktop 208 in a masked or redacted fashion via the customer details fetching service 214 and the case management service 212. This provides privacy to the customer 202 because the customer details are not yet revealed in full to the agent 210. Additionally, greater security is provided because the workflow cannot continue until the customer details are revealed to the agent 210, after additional steps are taken as explained in more detail below.

At this point, the case management service 212 requests an authentication code from case management code generating module 218. The authentication code generating module 218 initially creates a hash of the authentication code which is stored in the session database 220, along with details pertaining to the current session (e.g., customer phone number, customer e-mail, etc.), and an expiration for hash of the authentication code.

If the customer has not expressed or saved a preference for receiving the authentication code, the case management service 212 prompts the agent 210 at the agent desktop 208 to ask the customer's preference. For example, the customer may prefer to receive the authentication code at a particular e-mail address or telephone number. Once the preference is received, the authentication code generation module 218 communicates the authentication code to the customer 202 via e-mail 222 or telephone 224. Additionally, the authentication code generating module 218 destroys any copy or knowledge it has of the authentication code so it cannot be a source of compromise.

Once the customer 202 receives the authentication code, the customer 202 enters it via the web portal 204. A Bot service 226 communicates the authentication code to the session database 220. A hash of the authentication code entered by the customer 202 is created and compared to the hash stored by the session database 220. If the hash matches the stored hash, the customer is validated and the customer details are provided in full by case management service 212 to the agent 210 via the agent desktop 208.

If on the other hand the hash does not match the stored hash, the customer 202 may be prompted, at the web portal 204, to enter the authentication code again. The case management service 212 may request the authentication code generating module 218 to send a new authentication code to the customer 202 in accordance with the customer's preference. Additionally, the agent 210 may be prompted at the agent desktop 208 to send a new authentication code to the customer 202. Alternatively, the current support session may be ended by the case management service 212 (e.g., after too many failed attempts).

Figure 3:
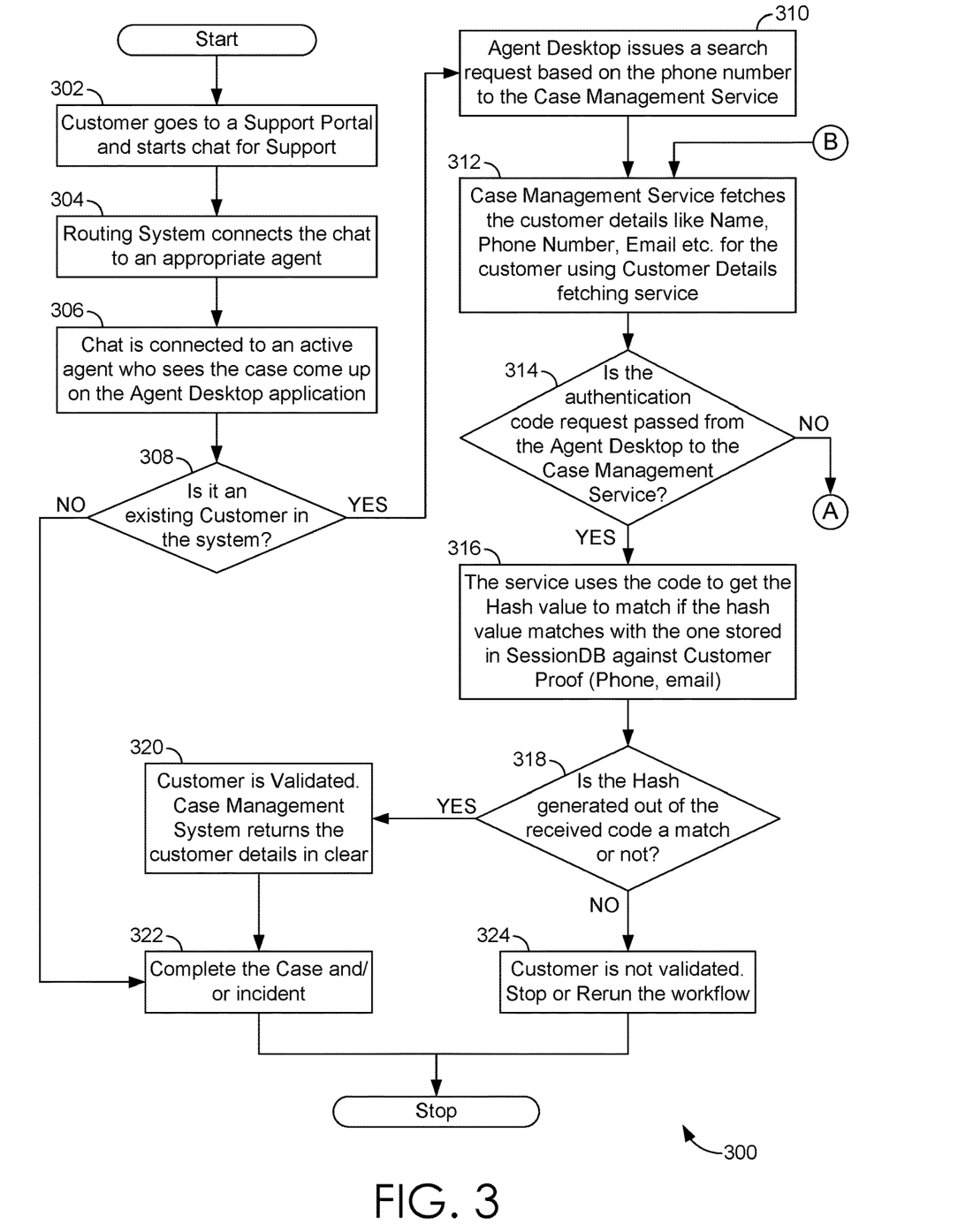
FIG. 3 is a flow chart showing a method of providing a mechanism for customer service with security and privacy in a support portal/Bot scenario, in accordance with aspects of the technology described herein.

Turning now to FIG. 3, a flow chart showing a method 300 of providing a mechanism for customer service with security and privacy in a support portal/Bot scenario is shown, according to an aspect of the technology described herein. Method 300 may be performed by any computing device (such as computing device described with respect to FIG. 1) with access to a case management framework (such as the one described with respect to FIG. 2) or by one or more components of the case management framework.

At step 302, a customer navigates to or launches a support portal. At the support portal, the customer can initiate a chat with customer support.

At step 304, the routing system connects the customer initiating the chat with an appropriate agent. For example, based on a particular issue the customer may have selected or particular details corresponding to the customer (e.g., customer type, location of the customer, product the customer is using to initiate the chat, and the like), the routing system determines the agent most suited to address the particular issue or customer. The routing system may also determine identify an agent based on an availability to respond to the customer.

At step 306, the chat is connected to an active agent. At this point, the case or incident is displayed to the agent via an agent device. For example, the case or incident may be displayed on an agent desktop application.

At step 308, it is determined whether the customer is an existing customer in the system. If the customer is not an existing customer in the system, the agent completes the case or incident, at step 322.

If the customer is an existing customer in the system, a search request is initiated at the agent device, at step 310. The search request utilizes the phone number of the customer to search the case management service.

At step 312, the case management service fetches the customer details (e.g., name, phone number, e-mail address, and the like) for the customer using the customer details fetching service.

At step 314, it is determined whether an authentication code request has been communicated from the agent desktop to the case management service.

If the authentication code request has not been communicated from the agent desktop to the case management service, at step 326, the case management service returns redacted information to the agent device for display. The case management service also requests the authentication code be communicated to the customer via e-mail or telephone.

At step 328, the agent is prompted at the agent device to enter the customer preference for sending the code to a pre-registered e-mail address or telephone.

At step 330, the case management service triggers a call to the authentication code generating module.

At step 332, the authentication code generating module generates a code, a hash of the code, and sends the code to the e-mail or telephone. The authentication code generating module also deletes the code itself to ensure no one is able to extract the code.

At step 334, the authentication modules sends the hash, the customer identifier, and an expiration for the hash to the session database for further reference.

At step 336, the customer is prompted to enter the code in the support portal. The support portal is connected via a Bot service to authenticate the code by fetching details from the session database.

At step 316, the case management service uses the code to compute a hash value. The hash value is compared to the hash value stored in the session database.

At step 318, it is determined if the computed hash matches the stored hash. If it does not match, the customer is not validated and the workflow is stopped or rerun, at step 324.

If the computed hash matches the stored hash, the customer is validated, at step 320. The agent completes the case or incident, at step 322.

Exemplary Case Management Framework for a Telephone Call Scenario

Figure 4:
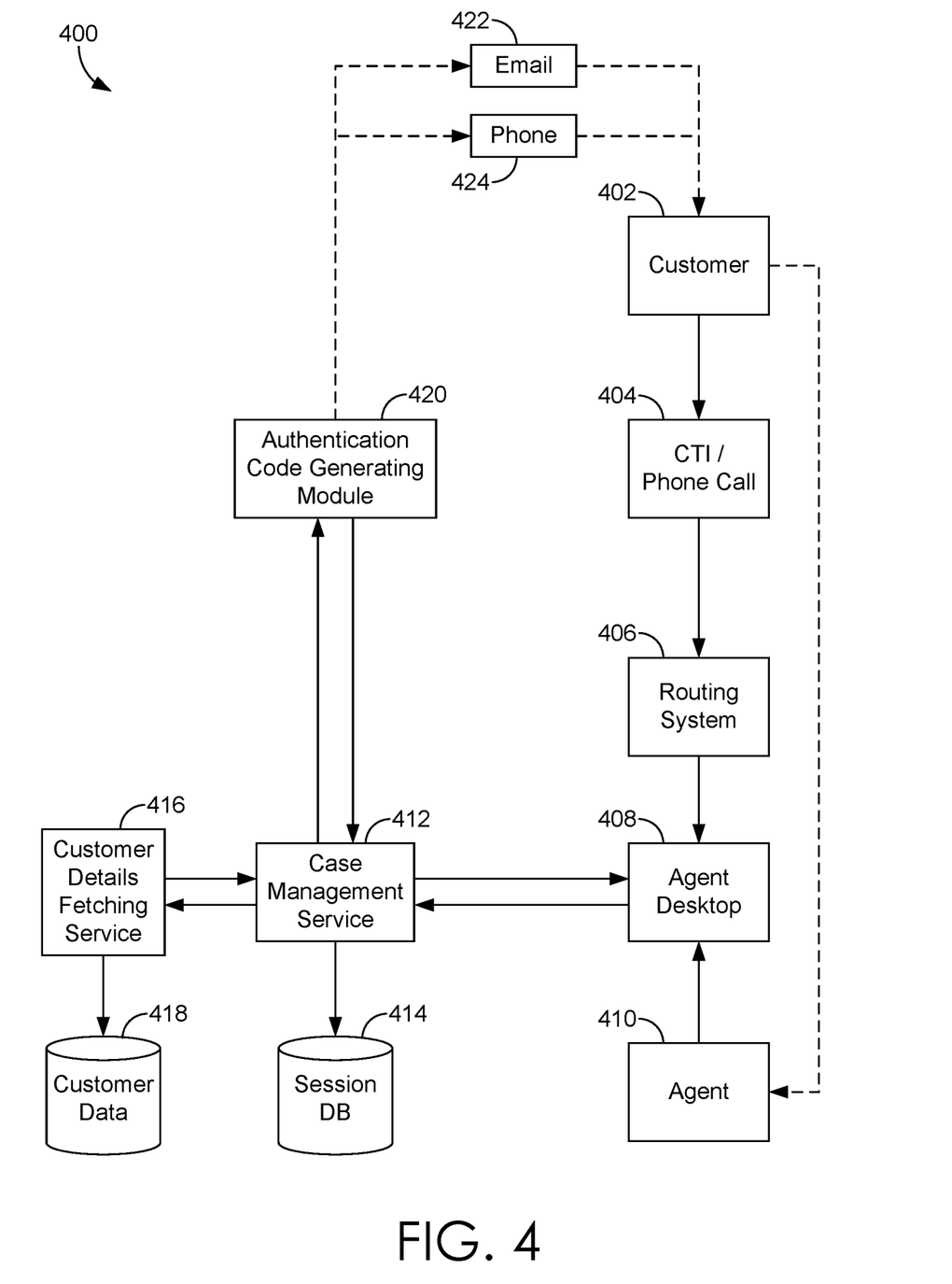
FIG. 4 is a block diagram showing an exemplary case management framework for a telephone call scenario, in accordance with aspects of the technology described herein.

Turning now to FIG. 4, an exemplary case management framework 400 is shown, in accordance with an aspect of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The case management framework 400 generally operates to provide a customer with security and privacy during a support request. As shown in FIG. 4, the case management framework 200 includes, among other components not shown, routing system 406, agent desktop 408, case management service 412, session database 414, customer details fetching service 416, customer database 418, and authentication code generating module 420. It should be understood that the case management framework 400 shown in FIG. 4 is an example of one suitable computing system architecture. Each of the components shown in FIG. 4 may be implemented via any type of computing device, such as computing device 100 described with reference to FIG. 1, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of routing systems, agent desktops, case management services, customer details fetching services, customer databases, authentication code generating modules, or session databases, may be employed within the case management framework 400 within the scope of the present disclosure. Each may comprise a single device or multiple devices cooperating in a distributed environment. For instance, the case management service 412 may be provided via multiple devices arranged in a distributed environment that collectively provide the functionality described herein. In other embodiments, a single device may provide the functionality of multiple components of the case management framework 400. For example, the case management service 412 may include the authentication code generating module 420 and/or the customer details fetching service 416. Additionally, other components not shown may also be included within the network environment.

As shown in FIG. 4, the case management framework 400 includes databases 414, 418. While databases 414, 418 are shown in FIG. 4, it should be understood that the case management framework 400 may employ any number of databases. Each database 414, 418 may store information that facilitate the case management framework 400 in providing a customer with security and privacy during a support request. For example, customer database 418 stores customer details for the customer. However, any customer details that are provided to the agent 410 via the agent desktop 408 are initially masked or redacted. Session database 414 stores a hash of the authentication code provided by authentication code generating module 420. The stored hash can be used to confirm the identity of the customer prior to unmasking the customer details provided to the agent 410 via the agent desktop 408.

The case management framework 400 initially receives a customer support request by way of a telephone call from customer 202 via computer telephony integration 404. Routing system 406 routes the telephone call to an agent desktop 408, which may be accessed by an agent 410 via any computing device (such as computing device 100 of FIG. 1). If the case management service 212 cannot locate any customer details for the particular customer (which may be looked up using the telephone number of the particular customer 402), the agent 410 proceeds with completing the customer support request.

However, if the case management service 412 locates customer details stored in the customer database 418 via the customer details fetching service 416, the customer details are initially returned to the agent desktop 408 in a masked or redacted fashion via the customer details fetching service 416 and the case management service 412. This provides privacy to the customer 402 because the customer details are not yet revealed in full to the agent 410. Additionally, greater security is provided because the workflow cannot continue until the customer details are revealed to the agent 410, after additional steps are taken as explained in more detail below.

At this point, the case management service 412 requests an authentication code from case management code generating module 420. The authentication code generating module 420 initially creates a hash of the authentication code which is stored in the session database 414, along with details pertaining to the current session (e.g., customer phone number, customer e-mail, etc.), and an expiration for hash of the authentication code.

If the customer has not expressed or saved a preference for receiving the authentication code, the case management service 412 prompts the agent 410 at the agent desktop 408 to ask the customer's preference. For example, the customer may prefer to receive the authentication code at a particular e-mail address or telephone number. Once the preference is received, the authentication code generation module 420 communicates the authentication code to the customer 402 via e-mail 422 or telephone 424. Additionally, the authentication code generating module 420 destroys any copy or knowledge it has of the authentication code so it cannot be a source of compromise.

Once the customer 402 receives the authentication code, the customer 402 is prompted (by the e-mail or telephone communication) to provide the authentication code to the agent (by telephone). The agent 410 may additionally be prompted, at the agent desktop 408, to enter the authentication code. Once the agent 410 enters the authentication code at the agent desktop 408, the authentication code is communicated to the case management service 412. A hash of the authentication code is created and compared to the hash stored by the session database 414. If the hash matches the stored hash, the customer is validated and the customer details are provided in full by case management service 412 to the agent 410 via the agent desktop 408.

If on the other hand the hash does not match the stored hash, the agent 410 may be prompted, at the agent desktop 408, to ask for and/or enter the authentication code again. The case management service 412 may request the authentication code generating module 420 to send a new authentication code to the customer 402 in accordance with the customer's preference. Additionally, the agent 410 may be prompted at the agent desktop 408 to send a new authentication code to the customer 402. Alternatively, the current support session may be ended by the case management service 412 (e.g., after too many failed attempts).

Figure 5:
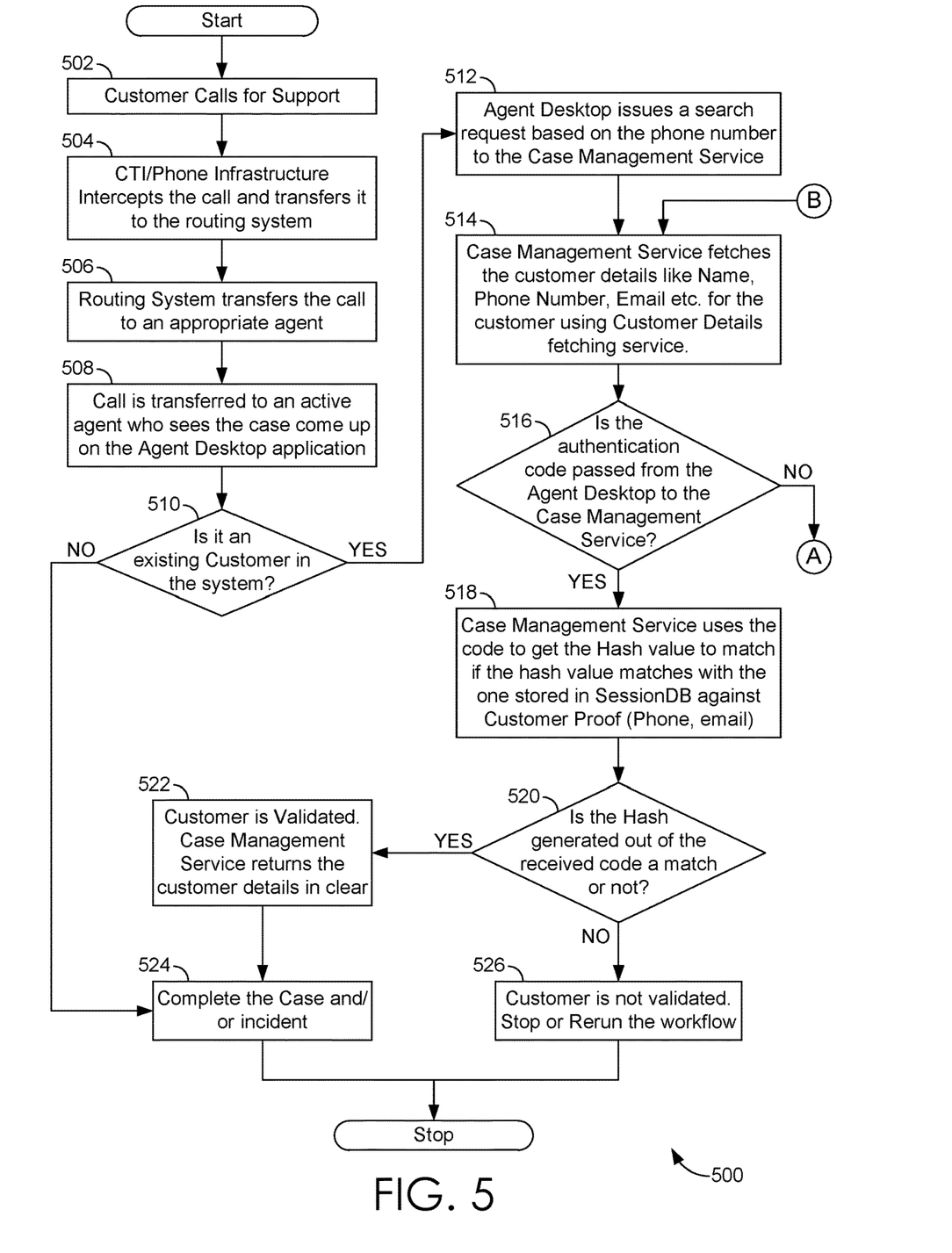
FIG. 5 is a flow chart showing a method of providing a mechanism for customer service with security and privacy in a telephone call scenario, in accordance with aspects of the technology described herein.

Turning now to FIG. 5, a flow chart showing a method 500 of providing a mechanism for customer service with security and privacy in a telephone call scenario is shown, according to an aspect of the technology described herein. Method 500 may be performed by any computing device (such as computing device described with respect to FIG. 1) with access to a case management framework (such as the one described with respect to FIG. 2) or by one or more components of the case management framework.

At step 502, a customer contacts customer support via telephone.

At step 504, the computer telephony integration or telephone infrastructure intercepts the call and transfers it to the routing system.

At step 506, the routing system transfers the call to an appropriate agent. For example, based on a particular issue the customer may have selected or particular details corresponding to the customer (e.g., customer type, location of the customer, product the customer is using to initiate the chat, and the like), the routing system determines the agent most suited to address the particular issue or customer. The routing system may also determine identify an agent based on an availability to respond to the customer.

At step 508, the call is transferred to an active agent. At this point, the case or incident is displayed to the agent via an agent device. For example, the case or incident may be displayed on an agent desktop application.

At step 510, it is determined whether the customer is an existing customer in the system. If the customer is not an existing customer in the system, the agent completes the case or incident, at step 524.

If the customer is an existing customer in the system, a search request is initiated at the agent device, at step 512. The search request utilizes the phone number of the customer to search the case management service.

At step 514, the case management service fetches the customer details (e.g., name, phone number, e-mail address, and the like) for the customer using the customer details fetching service.

At step 516, it is determined whether an authentication code has been communicated from the agent desktop to the case management service.

If the authentication code has not been communicated from the agent desktop to the case management service, at step 528, the case management service returns redacted information to the agent device for display. The case management service also requests the authentication code be communicated to the customer via e-mail or telephone.

At step 530, the agent is prompted at the agent device to enter the customer preference for sending the code to a pre-registered e-mail address or telephone.

At step 532, the case management service triggers a call to the authentication code generating module.

At step 534, the authentication code generating module generates a code, a hash of the code, and sends the code to the e-mail or telephone. The authentication code generating module also deletes the code itself to ensure no one is able to extract the code.

At step 536, the authentication modules sends the hash and the customer identifier along with an expiration for the hash to the case management service.

At step 538, the case management service stores the hash, the customer identifier, and the expiration in the session database for further reference.

At step 540, the agent asks the customer for the code. The customer provides the code to the agent and the agent enters the code.

At step 518, the case management service uses the code to compute a hash value. The hash value is compared to the hash value stored in the session database.

At step 520, it is determined if the computed hash matches the stored hash. If it does not match, the customer is not validated and the workflow is stopped or rerun, at step 526.

If the computed hash matches the stored hash, the customer is validated, at step 522. The agent completes the case or incident, at step 524.

Figure 6:
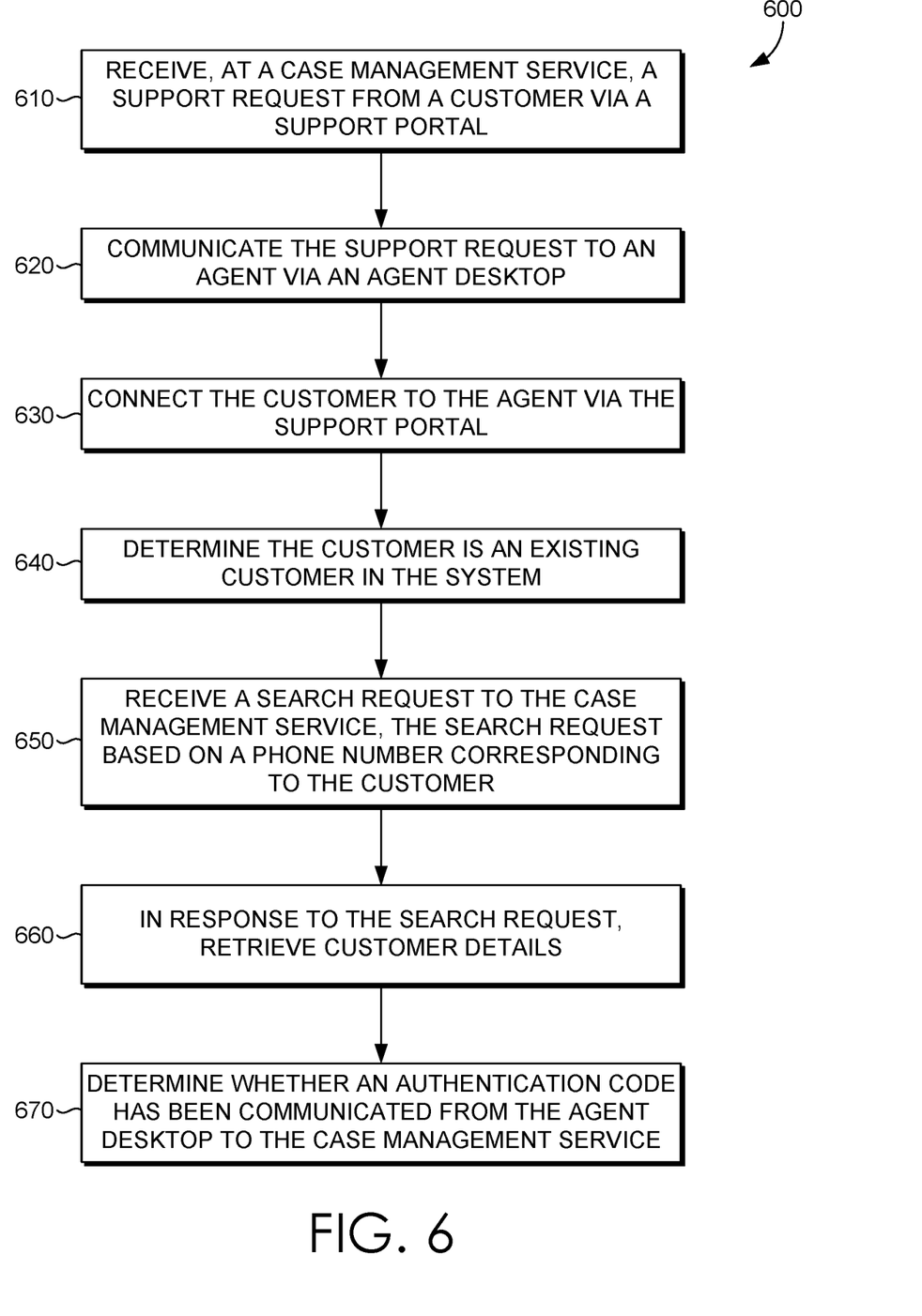
FIG. 6 is a flow chart showing a method of providing a mechanism for customer service with security and privacy, in accordance with aspects of the technology described herein.

Turning now to FIG. 6, a method 600 of providing a mechanism for customer service with security and privacy is shown, according to an aspect of the technology described herein. Method 600 may be performed by any computing device (such as computing device described with respect to FIG. 1) with access to a case management framework (such as the one described with respect to FIG. 2). Initially, as illustrated at step 610, a support request is received at a case management service from a customer via a support portal.

At step 612, the support request is communicated to an agent via an agent desktop. The customer is connected, at step 614, to the agent via the support portal. At step 616, the customer is determined to be an existing customer in the system. A search request is received, at step 618, at the case management service. The search request is based on a phone number corresponding to the customer.

In response to the search request, at step 614, customer details are retrieved. At step 616, it is determined whether an authentication code has been communicated from the agent desktop to the case management service.

Figure 7:
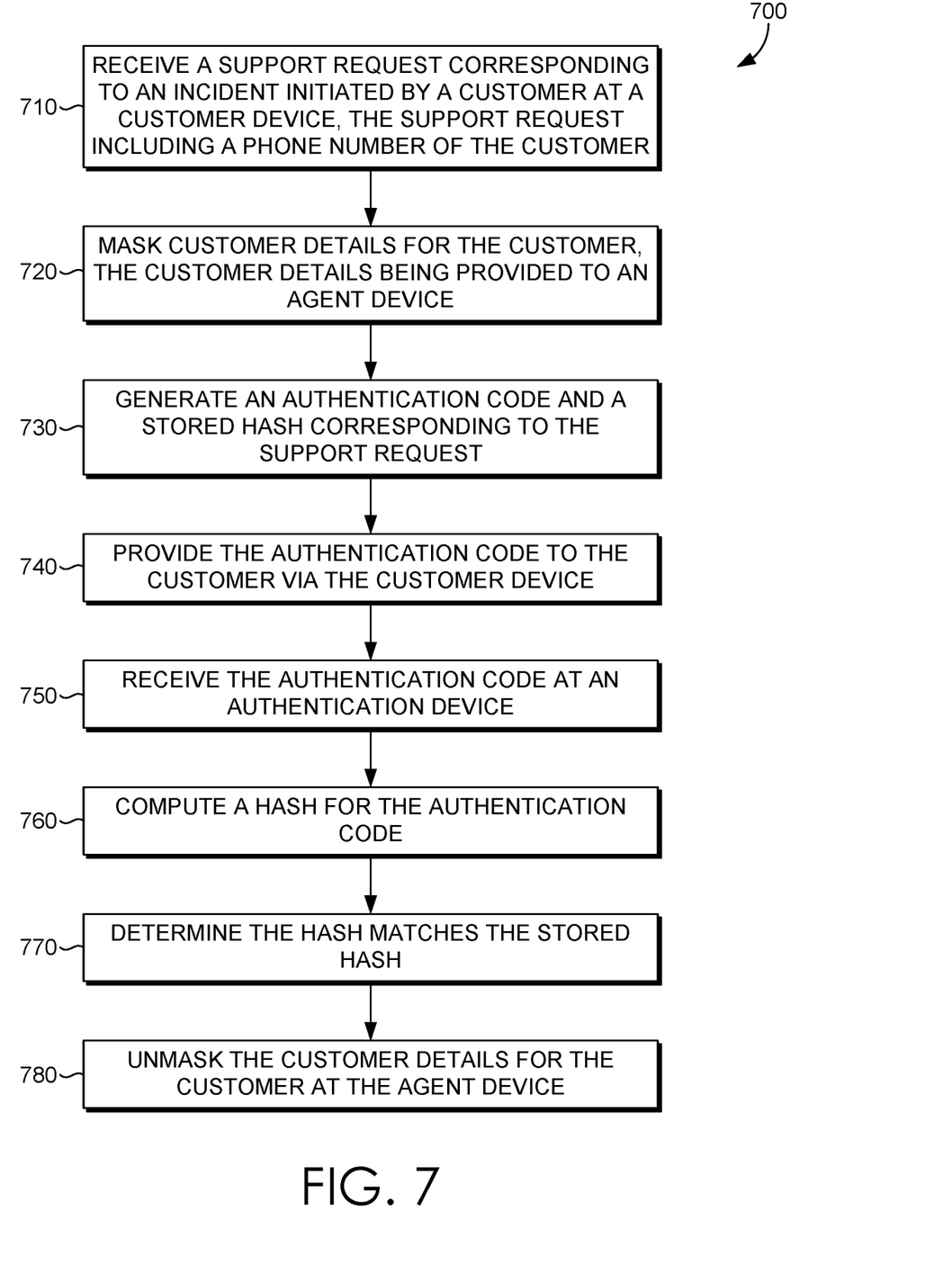
FIG. 7 is a flow chart showing a method of providing a mechanism for customer service with security and privacy, in accordance with aspects of the technology described herein.

Turning now to FIG. 7, a method 700 of providing a mechanism for customer service with security and privacy is shown, in accordance with aspects of the technology described herein. Method 700 may be performed by any computing device (such as computing device described with respect to FIG. 1) with access to a case management framework (such as the one described with respect to FIG. 2 or 4). Initially, as illustrated at step 710, a support request corresponding to an incident initiated by a customer at a customer device is received. The support request includes a phone number of the customer.

At step 712, customer details are provided to an agent device. Importantly, the customer details are masked. An authentication code corresponding to the support request is generated, at step 714. A hash of the authentication code is stored for verifying the customer's identity.

At step, 716, the authentication code is provided to the customer via the customer device. The authentication code is received, at step 718, at an authentication device. In various embodiments, the authentication code is communicated to the authentication device by the agent via the agent device or by the customer via a Bot service running on the customer device.

At step 720, a hash for the authentication code received at the authentication device is computed. The hash for the authentication code received at the authentication device is compared to the stored hash for the authentication code that was generated corresponding to the support request. This enables the customer's identity to be verified. If the hash matches the stored hash, at step 722, it is determined the hash matches the stored hash. Once the customer's identity is verified, at step 724, the customer details for the customer are unmasked at the agent device.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method of providing a mechanism for customer service with security and privacy, comprising:
receiving, at a case management service, a support request from a customer device via a support portal;
communicating the support request to an agent device;
connecting the customer device to the agent device via the support portal;
determining the support request was initiated by an existing customer;
receiving a search request at the case management service, the search request based on a phone number corresponding to the existing customer;
in response to the search request, retrieving customer details; and
providing redacted customer details to the agent device until an authentication code has been communicated from the agent device to the case management service;
at an authentication code generating module, generating the authentication code and a hash of the code;
communicating the authentication code to the customer device via the support portal;
storing the hash, a customer identifier, and an expiration for the stored hash in a session database for further reference; and
communicating a prompt to the customer device for the existing customer to enter the authentication code via the support portal, the authentication code being communicated to the session database via a Bot service.

2. The method of claim 1, further comprising communicating a prompt to via the agent device for the agent to enter a customer preference for the existing customer receiving the authentication code.

3. The method of claim 2, wherein the customer preference is via pre-registered electronic mail address or pre-registered telephone number.

4. The method of claim 2, wherein the authentication code is communicated to the existing customer in accordance with the customer preference.

5. The method of claim 1, further comprising deleting the authentication code at the authentication code generating module.

6. The method of claim 1, further comprising generating a hash of the authentication code communicated via the Bot service.

7. The method of claim 6, further comprising comparing the hash to the stored hash in the session database.

8. The method of claim 7, further comprising, upon determining the hash matches the stored hash, validating the support request.

9. The method of claim 8, further comprising providing the customer details to the agent device without redaction.

10. The method of claim 7, further comprising, upon determining the hash does not match the stored hash, invalidating the support request.

11. The method of claim 10, further comprising providing a prompt to the customer device for the existing customer to retry entering the authentication code via the support portal.

12. The method of claim 11, further comprising prematurely ending the support request.

13. The method of claim 9, further comprising receiving, from the agent device, an indication the support request has been completed.

14. A computer-readable storage media comprising computer-executable instructions, that when executed by a computer, causes the computer to perform operations to facilitate providing a mechanism for customer service with security and privacy, the operations comprising:
receiving a support request corresponding to an incident initiated by a customer at a customer device, the support request including a phone number of the customer;
providing customer details with redaction to an agent device;
generating an authentication code and a stored hash corresponding to the support request;
providing the authentication code to the customer device;
receiving the authentication code at an authentication device, the authentication code being communicated to the authentication device by a Bot service running on the customer device;
computing a hash for the authentication code received at the authentication device;
determining the hash matches the stored hash; and
providing the customer details without redaction to the agent device.

15. The media of claim 14, wherein the authentication code is communicated to the authentication device by the agent device.

16. A computerized system:
a processor; and a computer storage medium storing computer-useable instructions that, when used by the processor, cause the processor to:

receive, at a case management service, a support request from a customer device via a support portal;

communicate the support request to an agent device;

determine the support request was initiated by an existing customer;

receive a search request at the case management service, the search request based on a phone number corresponding to the existing customer;

in response to the search request, retrieve customer details; and provide customer details with redactions to the agent device until a valid authentication code has been communicated from the agent device to the case management service;

at an authentication code generating module, generate the authentication code and a hash of the code;

communicate the authentication code to the customer device via the support portal;

store the hash, a customer identifier, and an expiration for the stored hash in a session database for further reference; and communicate a prompt to the customer device for the existing customer to enter the authentication code via the support portal, the authentication code being communicated to the session database via a Bot service.

17. The computerized system of claim 16, further comprising generating a hash of the authentication code communicated via the Bot service.

18. The computerized system of claim 17, further comprising comparing the hash to the stored hash in the session database.

19. The computerized system of claim 18, further comprising, upon determining the hash matches the stored hash, validating the support request.

20. The computerized system of claim 19, further comprising providing the customer details without redaction to the agent device.

* * * * *